Oct. 30, 1934.   A. P. BOUCHER   1,978,833
SHEARS
Filed Aug. 26, 1931
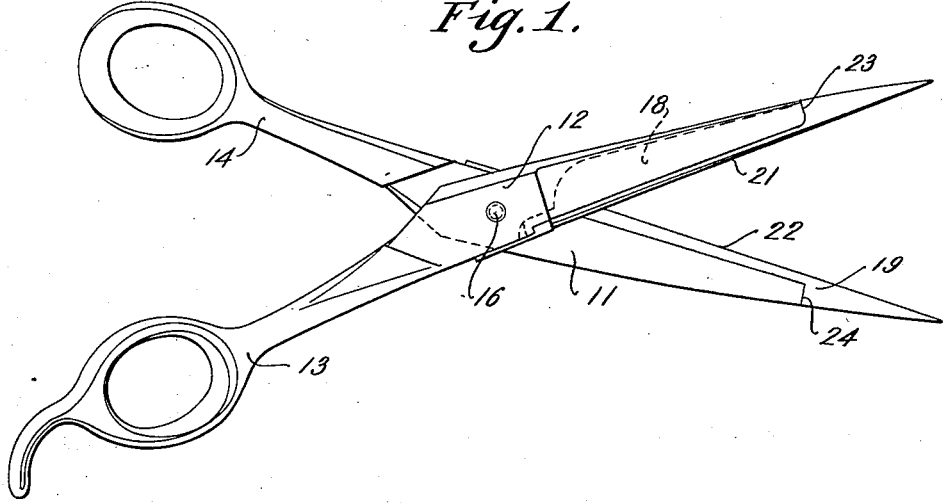
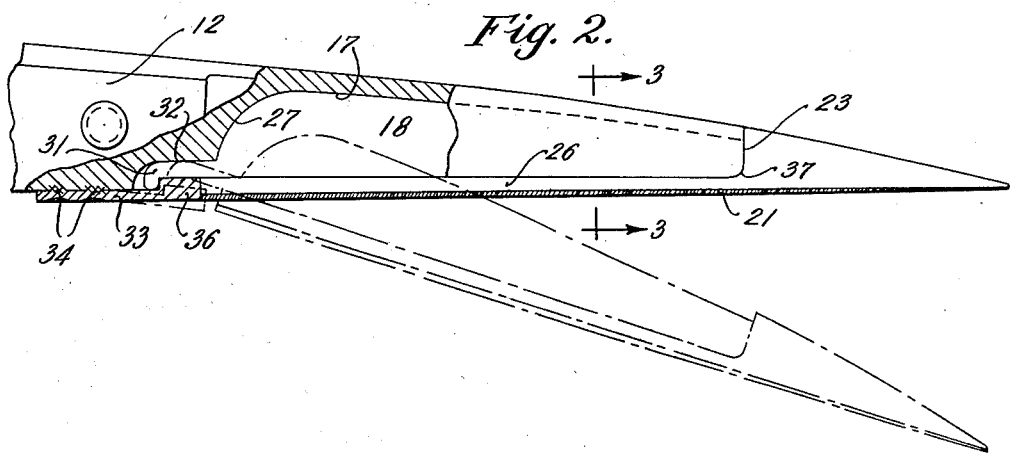
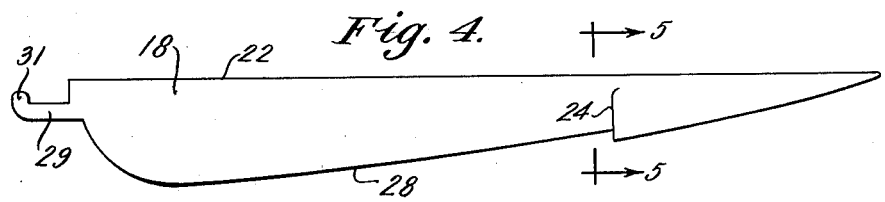
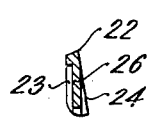
Inventor,
Albert P. Boucher,
by Roberts, Cushman & Woodberry
Attys.

Patented Oct. 30, 1934

1,978,833

UNITED STATES PATENT OFFICE 1,978,833

SHEARS

Albert P. Boucher, Portsmouth, N. H., assignor of one-tenth to Samuel W. Emery and two-fifths to Alfred B. Crosman, both of Portsmouth, N. H.

Application August 26, 1931, Serial No. 559,353

2 Claims. (Cl. 30—13)

This invention relates to cutting devices of the general type having coacting blades movable relatively toward and from each other for severing material. A pair of hand shears in any of the various forms adapted for general or specific uses is representative of devices of this general character. It is, of course, highly desirable that the cutting edges of the blades should be hard enough to take and to hold a good edge and yet soft enough to permit sharpening, as by stoning, filing, grinding or like operations. Moreover the hardness of the cutting edges should be uniform as soft spots result in unequal and therefore excessive wearing away of the blades especially during sharpening. Steels or other materials having these properties are so expensive that their use in a pair of shears, for example, can not ordinarily be justified. It is customary to manufacture shears from less expensive materials such as cast steel and to chill the cutting edges for obtaining the necessary hardness and wear-resisting properties. Shears made in this manner have not been satisfactory as the chilled metal usually varies in physical properties and as only a relatively slight depth of chill is permissible soft spots frequently occur in the cutting edges at least after a few sharpenings thereof.

Objects of the present invention are to overcome difficulties of the kind just mentioned and generally to improve the construction of devices of the class referred to so that blades thereof may be provided with cutting edges of any suitable or preferred material without necessitating a disproportionate increase in cost of the device as a whole; and also to provide a device of this general class of strong, durable and yet simple and efficient construction consisting of few parts which may be made by relatively inexpensive manufacturing operations.

In the drawing:

Fig. 1 is a plan view of a pair of shears;

Fig. 2 is a plan view of a portion of one of the blades shown in Fig. 1 with parts omitted and broken away for the purposes of illustration;

Fig. 3 is a section along the line 3—3 of Fig. 2;

Fig. 4 is a plan view of the opposite side of the insert strip shown in Fig. 2; and Fig. 5 is a section along the line 5—5 of Fig. 4.

The embodiment of the invention selected for illustration comprises a pair of shears having blade members 11 and 12 provided with handles 13 and 14 of any usual or approved form and pivotally connected by means of a pivot screw 16. As shown in Fig. 2, each blade member comprises a body portion having a longitudinal groove 17 extending from the outer or free end thereof toward the pivotal connection, these grooves being arranged in opposite blades in opposed relation to receive insert strips 18 and 19, respectively. These strips are preferably made of some material such as spring steel having the requisite hardness and other characteristics to hold good cutting edges 21 and 22 which form the cutting edges of the blades. As the insert strips 18 and 19 are mounted in both blades in a like manner and as these strips are of like construction, differing only in having parts oppositely arranged, the description herein of the construction illustrated in detail in Figs. 2 to 5 will suffice. The outer ends of the insert strips are shaped to form the points of the shears and taper or diverge lengthwise from the point to transverse shoulders 23 and 24 formed on opposite sides of each insert strip and in position to abut firmly against the free transverse ends of the blade body portions 11 and 12. Preferably the groove 17 is of uniform width and therefore the section of the insert fitting this groove may be of similar proportions preferably arranged to fit the groove snugly or with a compression fit, as illustrated in Figs. 3 and 5. Thus from the shoulder 24 of Fig. 5, the material of the insert strip is cut away substantially from the cutting edge 22, while on the other side of each insert strip, a longitudinal ledge or shoulder 26 (Figs. 2, 3 and 5) is provided adjacent the outer or cutting edge, and extends from the shoulder 23 to the opposite end of the strip. This ledge 26 is adapted to overlie and to rest solidly against the material forming one side of the groove, as illustrated in Fig. 3. At its inner end, the groove 17 preferably terminates in a wall 27 of a radius which may easily be formed by the cutter used in grooving the blade body, although of course it will be understood that this groove may have a straight transverse end wall, if desired. Likewise, the back or inner edge 28 of each strip is formed complementary to the base of the groove and is curved to fit the end wall 27 thereof.

In order to lock the inserts releasably in the grooves, each insert strip may be provided with a rearwardly extending tongue 29 having an offset or abutment portion 31. The body portion of the blade is cut away from the end wall of the groove 17, as indicated at 32, to provide a recess for receiving the tongue 29 and a latch-piece 33 is formed on the blade to overlie this recess. Preferably this latch-piece is made separate and spot-welded to the body portion of the blade, as indicated at 34. The free end of the latch member is offset inwardly of the recess 32 to provide a locking abutment 36. These parts are so proportioned and arranged with respect to the tongue 29 and the abutment 31 of an insert piece that the latter may be inserted by arranging it in a position such as that shown in dot and dash lines in Fig. 2, with the strip partially inserted in the groove, and the abutment 31 disposed in the recess 32. By rocking or swinging the insert strip from this position toward the blade body, it will be seen that this pivotal motion will be effective for bringing the abutment 31 behind the abutment 34 of the latch member, and as the parts arrive at the full line position shown in Fig. 2, the shoulders 23 and 24 are brought firmly against the transverse end surfaces of the blade body. Thus the latch member 33 and the cooperating abutments 31 and 36 serve to lock the insert strip from longitudinal movement outwardly or to the right, as viewed in Fig. 2, while the shoulders 23 and 24 are effective to prevent longitudinal movement in the other direction. Likewise, the longitudinal ledge 26 provides a firm support for the insert as does also the back edge 28 of this strip which preferably rests solidly on the base of the groove 17. While the latch member 33 may be relatively rigid, it is advantageous to provide for slight yielding movement of this member and so to proportion the parts that the abutment 36 engages the neck or tongue 29 and presses the same against the opposite wall of the recess 32 with a slight tension. It will be evident that each insert strip may be removed by pulling the outer or pointed end thereof outwardly from the groove, or downwardly as viewed in Fig. 2, to swing the strip to the position indicated in dot and dash lines, thereby releasing the interlocking abutments 31 and 36.

An important advantage of this construction is that it provides for ready removal of these insert strips and thus for replacement when the latter have become worn excessively, while the improved arrangement avoids any tendency for loosening of the strips during ordinary use of the shears. In operation of the shears, it will be evident that as most of the cutting is performed by the outer end portions of the blades, there is a tendency for these blades to pivot about the point 37 on the free end of the blade body in such a manner as to swing the insert in a counterclockwise direction, as viewed in Fig. 2. This tendency is effectively opposed by the abutment 36 of the latch member coacting to hold the tongue 29 against the base of the recess 32.

From the foregoing, it will be evident that while shears made according to this invention may be provided with cutting edges of any desired material, the handles and body portions of the blades may be made of cast or molded material, either of metal or of suitable composition, or of soft steels, wrought iron or like metals, which may be formed very closely to finished dimensions by simple operations, such as by drop forging, stamping, punching or the like. Also, the grooving or slotting of the blades, as well as the machining of the inserts, involve only simple operations, and the device as a whole is inexpensive to manufacture and assemble.

Thus shears having high quality wear-resistant cutting edges may be provided at a relatively low cost and the users of such devices can effect further economies by merely removing insert strips having worn edges and replacing them with new strips which may be supplied at a price at least to compete with the ordinary pair of shears and yet, because of their superior quality, render longer and more satisfactory service.

It should be understood that the present disclosure is for the purpose of illustration only and that this invention includes all modifications and equivalents which fall within the scope of the appended claims.

I claim:

1. A pair of shears comprising pivotally connected blade members having opposed longitudinal grooves therein, the outer ends of the blade members having transversely disposed surfaces providing end abutments, a removable insert strip disposed in each groove and engaging the side walls thereof with a compression fit, each of said strips extending longitudinally of its blade member beyond the end thereof, the extending portion of each of said strips having laterally projecting transversely disposed shoulders complementary to and engageable with said end abutments, each insert strip having a transverse recess adjacent the rear end thereof to receive a retaining abutment, a retaining member rigidly secured to said blade member and disposed in said recess for holding each insert strip from longitudinal movement in one direction, said shoulders and said end abutments being effective for holding each insert strip from longitudinal movement in the other direction, each insert strip being removable from its blade member by swinging the outer end of the insert strip transversely of the blade member to disengage said end abutments and shoulders and causing the insert strip to pivot about the inner end thereof to disengage the retaining member from said recess.

2. A pair of shears comprising pivotally connected blade members having opposed longitudinal grooves therein, the outer ends of the blade members having transversely disposed surfaces providing end abutments, a removable insert strip disposed in each groove and engaging the side walls thereof with a compression fit, each of said strips extending longitudinally of its blade member beyond the end thereof, the extending portion of each of said strips having laterally projecting transversely disposed shoulders complementary to and engageable with said end abutments, a tongue extending rearwardly from the inner end of each insert strip, each blade member having a recess to receive this tongue, a resilient member overlying the recess, and cooperating abutments on said resilient member and said tongue for holding each insert strip from longitudinal movement in one direction, said shoulders and said end abutments being effective for holding each insert strip from longitudinal movement in the other direction, each insert strip being removable from its blade member by swinging the outer end of the insert strip transversely of the blade member to disengage said end abutments and shoulders, said resilient member being yieldable to provide for rocking the cooperating abutments of said tongue and said resilient member out of engagement during this transverse swinging movement of the insert strip.

ALBERT P. BOUCHER.